March 19, 1929.  H. E. WHITNEY  1,706,336
MEASURING CAN
Filed Aug. 12, 1927   2 Sheets-Sheet 1

INVENTOR:
Horace E. Whitney
By
ATTORNEYS:

March 19, 1929.  H. E. WHITNEY  1,706,336
MEASURING CAN
Filed Aug. 12, 1927  2 Sheets-Sheet 2
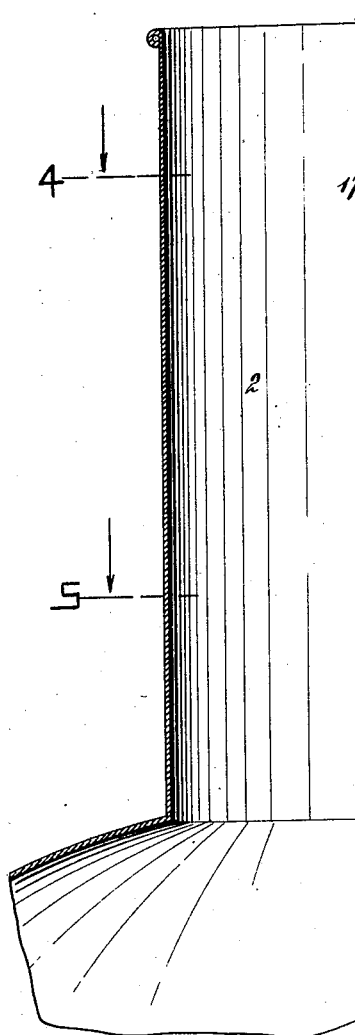
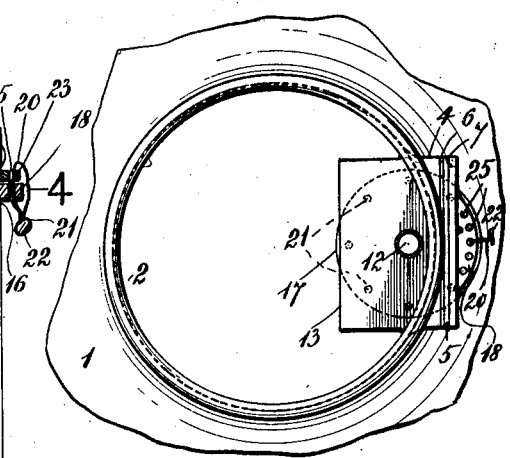
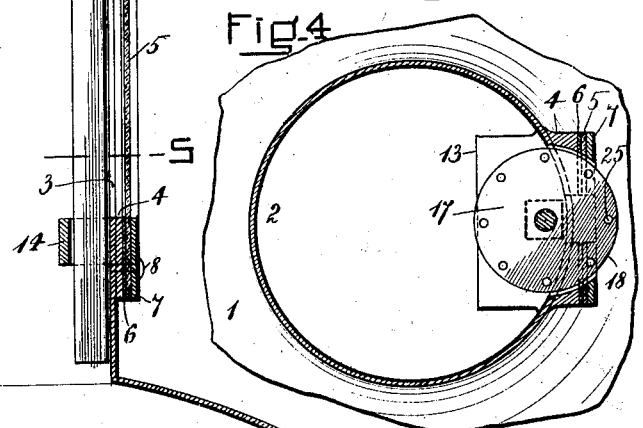
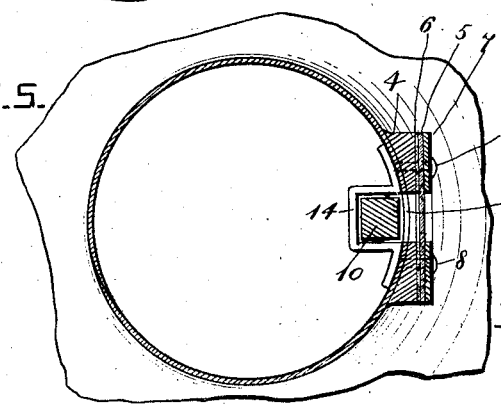
INVENTOR:
Horace E. Whitney
BY
ATTORNEYS Patented Mar. 19, 1929.

1,706,336

UNITED STATES PATENT OFFICE.

HORACE E. WHITNEY, OF CAMBRIDGE, MASSACHUSETTS.

MEASURING CAN.

Application filed August 12, 1927. Serial No. 212,495.

The invention relates to an improvement in measuring cans of that type in which the can is provided with a gauge by which the liquid content of the can may be observed and measured. The gauge generally takes the form of a transparency or sight usually arranged in the neck of the can and to which sight the liquid content of the can has accces and through which the top level of the content may be observed. A scale is provided adjacent the sight by which the level of the content observed through the sight may be measured with relation to the scale. Provision is made by which the scale may be moved vertically for adjustment and set in a determinate position where a certain notation on the scale will indicate a precise level for a certain or determinate amount of content in the can. Further provision is made for locking and sealing the scale in its set position, its further adjustment being prohibited until the seal is broken when the scale may be reset and afterward resealed.

The object of the invention is to provide in as simple a manner as possible a gauge embodying all of these principles and especially to provide an arrangement in which the adjustment of the scale portion of the gauge and the sealing thereof are obtained from outside the can.

The invention can best be seen and understood by reference to the drawings, in which—

Fig. 2 is a longitudinal vertical section of the construction shown in Fig. 1.

Fig. 3 is a plan.

Fig. 4 is a section on the line 4—4 of Fig. 2, and

Fig. 5 is a section on the line 5—5 of Fig. 2.
Referring to the drawings:—

Figure 1:
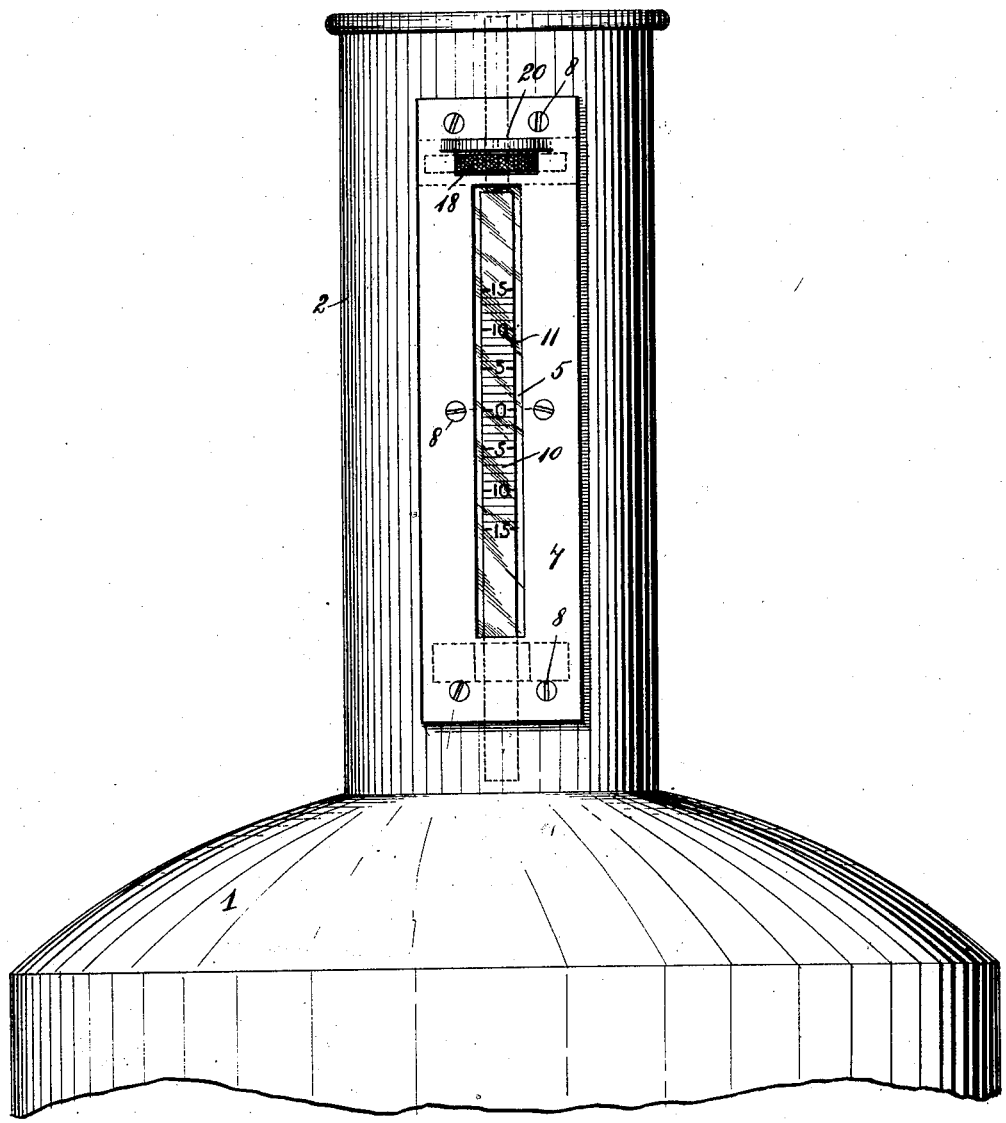
Figure 1 is a front elevation of a can the neck of which is fitted with a gauge embodying the invention, such portion of the can body only being shown as is necessary for a proper understanding of the invention.

1 represents the can body and 2 the neck. The neck has in it a longitudinal slot 3 with a raised rim facing 4 extending around this slot and deepened at the top and bottom above and below the slot.

The slot 3 is covered and closed by means of a transparency or sight 5 preferably consisting of a glass plate or plate of isinglass. A packing 6 of some material suitable to form a liquidtight joint is laid between the glass and the rim facing, and the glass is held in place by means of a frame 7 attached to the facing by screws 8 passed through the frame and sight and fastening into the facing.

With this arrangement the liquid content of the can rising in its neck has access to the sight and the top level of the liquid is observable through the sight.

Arranged inside the neck of the can back of the transparency or sight and extending longitudinally in line therewith but spaced therefrom is a scale 10. This scale takes the form of a metal bar the side of which facing the transparency or sight is provided with numeral indications 11 and this side of the bar is also preferably whitened or made light in color by enameling and on which enamel the numeral indications appear so that they may be clearly discernible through the sight and liquid which lies between the sight and the scale.

The scale at its top end is provided with a threaded extension or screw 12. This screw passes upwardly through a housing 13 arranged above the sight and extending inwardly from the interior of the neck of the can adjacent its top end, the screw being freely movable in a vertical direction through this housing. At its lower end below the sight the scale is loosely embraced by a strap 14 extending from the interior of the neck of the can. The scale is preferably square or rectangular in cross section and the strap is similarly formed to embrace the scale. Thus mounted and arranged, the scale is freely movable in a vertical direction up or down with relation to the sight but with no permitted rotation.

The scale is adjusted and retained in any determinate adjusted position in the following manner: The interior or chamber 15 of the housing 13 through which the threaded end 12 of the scale passes extends outwardly through the shell of the neck and through a horizontal slot 16 formed in the deepened portion of the rim facing 4 and frame 7 fitting over it above the slot 3 in the neck. Arranged within this chamber is a nut 17 through which the threaded end 12 of the scale extends, the nut being threaded thereon so that as the nut is turned the scale will be moved thereby up or down depending upon the direction of the nut's turning and the scale will be held in any adjusted position by the nut contained as it is within the chamber of the housing. The arrangement of the parts is such that the nut will extend outwardly through the horizontal slot 16 in the rim facing 4 and frame 7 as aforesaid so that a segmental portion 18 of the nut will always project beyond the face of the frame so as to be accessible outside this frame for turning the nut. In other words, the nut is turned for the purpose of adjusting the scale by an application of force to the segmental portion 18 of the nut which is always projecting beyond the face of the frame which retains the sight outside the neck of the can.

After the setting of the scale it is sealed by passing a wire 20 through an opening 21 in the segmental portion 18 of the nut and then applying a seal 22 to the ends of the wire. In order that the wire may be passed through different segmental portions of the nut as they respectively appear outside the neck of the can as the nut is turned, the nut is provided with a number of openings 21 which are circumferentially arranged and so spaced from one another that there will be at least one of the openings 21 in any segmental portion of the nut appearing outside the neck of the can.

After the wire 20 has been passed through a segmental portion of the nut projecting outside the neck of the can the nut can no longer be rotated for changing the position of the scale owing to the fact that the wire will draw against the face of the plate 7 through the slot 16 in which the nut is projecting. The nut is still capable, however, of some degree of turning. To obviate this, the plate 7 is provided with a flange 23 arranged to lie just above the projecting segmental portion of the nut and this flange is provided with a number of openings 25 through it. These openings lie very close together and are arranged in the form of an arc following the path described by one of the openings in the segmental portion of the nut as the nut is turned. The wire 20 is accordingly passed not only through the opening in the segmental portion of the nut but also through one of the openings 25 in the flange or that opening 25 which lies nearest the opening in the segmental portion of the nut when the nut has been turned to its properly adjusted position after positioning the scale. The ends of the wire are then sealed as before.

In the use of the measure, assuming it to contain a determinate number of gallons of liquid content, such number of gallons is first accurately measured and then poured into the can. The top level of the liquid then contained in the can may be seen through the sight of the gauge. The scale is then adjusted by turning the nut to a position where a certain notation on the scale will lie just flush with the top level of the contained liquid as may be determined by looking through the sight. The nut is then sealed in this position. In the subsequent use of the can as liquid is poured therein in an amount supposed to correspond with the capacity of the can, it will at once be apparent by observing the level of the contained liquid with reference to the scale whether the amount of liquid is correct or not.

Having thus fully described my invention, I claim and desire to secure by Letters Patent of the United States:—

1. A measuring can having a neck with a vertical slot in it and an opening through the neck above the slot, means for closing the slot including a transparency, a scale arranged inside the neck in line with the slot, spaced from it and from the transparency, a rotary member arranged to project through the opening in the neck and extend in part outside the opening whereby the rotary member may be turned from outside the neck, and means whereby the scale may be moved in an endwise direction to a determinate adjusted position on turning the rotary member.

2. A measuring can having a neck with a vertical slot in it and an opening through the neck above the slot, means for closing the slot including a transparency, a scale arranged inside the neck in line with the slot, spaced from it and from the transparency, a rotary member arranged to project through the opening in the neck and extend in part outside the opening whereby the rotary member may be turned from outside the neck, and means whereby the scale may be moved in an endwise direction to a determinate adjusted position on turning the rotary member, the rotary member being provided with openings through it arranged and spaced from one another whereby an opening will be contained in any portion of the member lying outside the neck as aforesaid for receiving a sealing wire.

3. A measuring can having a neck with a verical slot in it and an opening through the neck above the slot, means for closing the slot including a transparency, a scale arranged inside the neck in line with the slot, spaced from it and from the transparency, a rotary member arranged to project through the opening in the neck and extend in part outside the opening whereby the rotary member may be turned from outside the neck, and means whereby the scale may be moved in an endwise direction to a determinate adjusted position on turning the rotary member, the rotary member being provided with openings through it arranged and spaced from one another whereby an opening will be contained in any portion of the member lying outside the neck as aforesaid, and a piece fixed to the neck adjacent the outwardly projecting portion of the rotary member having openings in it arranged whereby a sealing wire may be passed through one of the openings in the fixed piece and through an opening in the projecting portion of the rotary member.

4. A measuring can having a neck with a vertical slot in it and an opening through the neck above the slot, means for closing the slot including a transparency, a scale arranged inside the neck in line with the slot, spaced from it and from the transparency, said scale having a top threaded end portion, means inside the neck fixed thereto for retaining the scale to have permitted endwise movement without rotation and including a housing through which the threaded end portion of the scale projects, and a nut on the threaded end portion of the scale lying within the housing and projecting in part outwardly through said opening in the neck whereby a segmental portion of the nut will lie outside the neck.

5. A measuring can having a neck with a vertical slot in it and an opening through the neck above the slot, said neck being also provided on the exterior with a raised rim facing extending around said slot and opening, a transparency covering said slot, a slotted plate fixed to said rim facing for holding the transparency in place and through which plate said opening in the neck is continued, a scale arranged inside the neck in line with said slot, spaced from it and from the transparency, means for retaining the scale to have permitted endwise movement without rotation, a rotary member arranged to project through the opening in the neck and through the opening in said plate whereby the member may be turned from outside said neck and plate, and means whereby the scale may be moved in an endwise direction to a determinate adjusted position on turning the rotary member.

6. A measuring can having a neck with a vertical slot in it and an opening through the neck above the slot, said neck being also provided on the exterior with a raised rim facing extending around said slot and opening, a transparency covering said slot, a slotted plate fixed to said rim facing for holding the transparency in place and through which plate said opening in the neck is continued, a scale arranged inside the neck in line with said slot, spaced from it and from the transparency, the scale having a top threaded end portion, means inside the neck fixed thereto for retaining the scale to have permitted endwise movement without rotation and including a housing through which the threaded end portion of the scale projects, and a nut on the threaded end portion of the scale lying within the housing and projecting in part outwardly through the openings in the neck and plate whereby a segmental portion of the nut will lie outside the neck and face of the plate.

HORACE E. WHITNEY.